Patented July 18, 1944

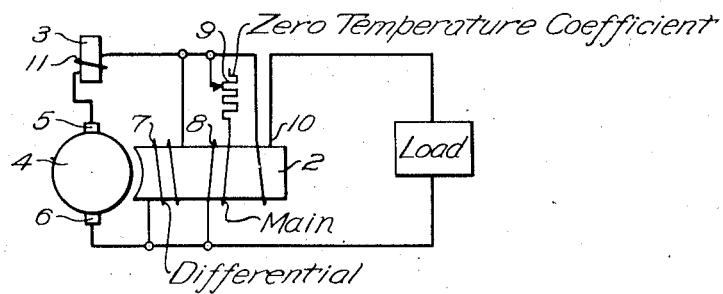

2,354,119

UNITED STATES PATENT OFFICE 2,354,119

TEMPERATURE-COMPENSATED DYNAMO-ELECTRIC MACHINE

William R. Harding, Murrysville, Pa., assignor to Westinghouse Electric & Manufacturing Company, East Pittsburgh, Pa., a corporation of Pennsylvania Application May 21, 1942, Serial No. 443,860

8 Claims. (Cl. 171—223)

My invention relates to dynamo-electric machines which are compensated against changes in the effective exciting ampere-turns on the machine as a result of changes in the temperature of the exciting windings. While my invention is susceptible of other applications, it was more particularly designed to provide a source of constant direct-current voltage on an electric shovel to be used on the iron range near Duluth, where the outside temperature varies from —20° F. to 100° F., and where an almost constant exciter-voltage is required. This ambient temperature-range, added to the hot-and-cold temperature-difference in the machine, would produce something like a 40 or 50% variation in the terminal-voltage of the machine if a constant-voltage exciter were provided for the field-windings, and a considerably larger variation in terminal-voltage if self-excitation were used.

It is true that several types of regulators are available, which would keep the voltage constant, but it is more desirable, from the point of view of cost and maintenance, to have an inherently constant voltage, with no external regulator.

The voltage of a direct-current generator is dependent upon the speed, the load, and the excitation. The first problem can be eliminated by driving the generator at a constant speed. The voltage-decrease due to load can be compensated by an increase in excitation by means of series field coils. The excitation provided by a shunt field varies as the field-voltage and inversely as the field-resistance. In a self-excited, constant-voltage, direct-current generator, the field-voltage is constant, but the field-resistance increases with its temperature, both as a result of its electrical heating during operation, and as a result of the still greater ambient-temperature variations.

It is an object of my present invention to provide means and combinations for keeping an approximately constant field-excitation, or resultant effective exciting ampere-turns, throughout temperature-changes.

In the accompanying drawing, I have illustrated my invention in a schematic diagram showing the application of the invention, by way of example, to a 12 kw., 125-volt, direct-current generator.

I have illustrated a dynamo-electric machine having a field member which is represented by an exciting pole 2 and a commutating pole 3, and an armature member 4 represented as having a commutator-member engaged by brushes 5 and 6.

In accordance with my invention, I provide two shunt field windings on the exciting pole or poles 2, namely a differential shunt field winding 7, and a cumulative or main shunt field winding 8, said shunt field windings being of copper or other conductor which has a substantial temperature coefficient of resistance; and a resistor 9 is connected in series with the cumulative or main winding 8, said resistor having a substantially zero, or very low, temperature coefficient of resistance. A common-voltage energizing-means is provided for both of the shunt field windings 7 and 8, and preferably this energizing-means is of a constant voltage, either self-excited or separately excited, a self-excited machine being illustrated, with the shunt field windings connected across the machine-terminals.

In the illustrated machine, the main or cumulative shunt field winding 8 is of low resistance, even in series with an external resistor 9 of about twice the resistance of the main or cumulative field 8, so that it has a larger current than the differential shunt field winding 7, and the main or cumulative winding has the smaller number of turns, but its ampere-turns are about three times the ampere-turns provided by the differential winding 7. Thus, the main or cumulative field provides about 150% of the required excitation, and the differential field compensates for the excess 50% excitation. The amounts of copper in the cumulative and differential windings, and their disposition and arrangement, are such that their temperatures rise, in service, at approximately the same rate. It will be noted, however, that the ratio between the cumulative and differential ampere-turns is approximately the same as the ratio between the voltage consumed in the cumulative winding and the voltage impressed on the cumulative winding and the resistor together, at an operating condition of the machine. Thus, the resistance-changing effects of temperature-changes in the two shunt field windings substantially neutralize each other, being of about the same magnitude, and one being additive and the subtractive. Hence, the effective resultant ampere-turns due to the shunt field windings, which is the difference between the ampere-turns of the cumulative and differential windings, is substantially constant over a substantial range of temperatures.

From the foregoing, it will be apparent that I have compensated for the voltage-changing effects of temperature, in the machine. The generator is driven at a constant speed, thus eliminating speed as a cause of voltage-variation.

The varying effects of armature-reaction under varying load-conditions may be either overcompensated, under-compensated or approximately exactly compensated, if desired, by a series field winding 10 on the exciting pole or poles 2, as shown.

It is also usually desirable to provide the machine with a commutating field winding 11, which is illustrated as being mounted on a separate interpolar or commutating pole or poles 3.

Tests have amply demonstrated that a generator constructed as above described, and driven at a constant speed, has a substantially constant voltage over a temperature-range of 100° C.

It will be understood, of course, that if it should be desired, the voltage could be made to rise as the temperature increases, by properly proportioning the two shunt fields 7 and 8 and the resistor 9.

It will further be noted that my field-arrangement would work equally well if the generator were separately excited at a constant voltage, instead of being self-excited.

It will further be understood that my generator, like any other generator, is susceptible of being used as a motor, and I desire the term "generator" to be construed in this broad sense including motor-operation.

It will still further be understood that my generator is capable of operation with either the differential field or the cumulative field disconnected, either at the same speed or at a different speed, and either at the same voltage or at a different voltage.

While I have illustrated my invention in a single exemplary form of embodiment, I desire it to be understood that it is susceptible of variation as to precise proportions and structures, as will be obvious to those skilled in the art. I desire, therefore, that my appended claims be accorded the broadest construction consistent with their language.

I claim as my invention:

1. A dynamo-electric machine having a differential exciting field winding and a main exciting field winding, said exciting field windings being of a conductor having a substantial temperature coefficient of resistance, a resistor connected in series with the main winding, said resistor having a small temperature coefficient of resistance, and a common-voltage energizing-means for both of said exciting field windings.

2. The invention as defined in claim 1, characterized by the ampere-turns of the differential winding bearing approximately the same ratio to the ampere-turns of the main winding as the voltage consumed in the main winding bears to the common voltage impressed on the main winding and the resistor together, and also impressed on the differential winding, at an operating condition of the machine.

3. A dynamo-electric machine having a differential exciting field winding and a main exciting field winding, said exciting field windings being of a conductor having a substantial temperature coefficient of resistance, a resistor connected in series with the main winding, said resistor having a small temperature coefficient of resistance, and a substantially constant-voltage energizing-means for both of said exciting field windings, the ampere-turns of the differential winding bearing approximately the same ratio to the ampere-turns of the main winding as the voltage consumed in the main winding bears to the substantially constant voltage impressed on the main winding and the resistor together, and also impressed on the differential winding, at an operating condition of the machine.

4. A direct-current dynamo-electric machine operable at a predetermined effective-flux characteristic, over a wide range of temperatures, comprising a field member, an armature member, a differential shunt field winding on the field member, a main shunt field winding on the field member, said shunt field windings being of a conductor having a substantial temperature coefficient of resistance, a resistor connected in series with the main winding, said resistor having a small temperature coefficient of resistance, and a common-voltage energizing-means for both of said shunt field windings, the amounts of conducting material in the main and differential windings and the disposition and arrangement of the windings being such that their temperatures rise in service at approximately the same rate, the main winding having a larger current and a smaller number of turns than the differential winding, the ampere-turns of the differential winding bearing approximately the same ratio to the ampere-turns of the main winding as the voltage consumed in the main winding bears to the common voltage impressed on the main winding and the resistor together, and also impressed on the differential winding, at an operating condition of the machine.

5. A direct-current dynamo-electric machine operable at a predetermined effective-flux characteristic, over a wide range of temperatures, comprising a field member, an armature member, a series field winding, a differential shunt field winding on the field member, a main shunt field winding on the field member, said shunt field windings being of a conductor having a substantial temperature coefficient of resistance, a resistor connected in series with the main winding, said resistor having a small temperature coefficient of resistance, and a substantially constant-voltage energizing-means for both of said shunt field windings, the amounts of conducting material in the main and differential windings and the disposition and arrangement of the windings being such that their temperatures rise in service at approximately the same rate, the main winding having a larger current and a smaller number of turns than the differential winding, the ampere-turns of the differential winding bearing approximately the same ratio to the ampere-turns of the main winding as the voltage consumed in the main winding bears to the substantially constant voltage impressed on the main winding and the resistor together, and also impressed on the differential winding, at an operating condition of the machine.

6. A direct-current dynamo-electric machine operable at a substantially constant effective flux over a wide range of temperatures, comprising a field member, an armature member, a differential shunt field winding on the field member, a main shunt field winding on the field member, said shunt field windings being of a conductor having a substantial temperature coefficient of resistance, a resistor connected in series with the main winding, said resistor having a small temperature coefficient of resistance, and a substantially constant-voltage energizing-means for both of said shunt field windings, the machine having such relative proportions of resistances of the main and differential shunt field windings and of the resistor, and such relative members of turns of the main and differential shunt field windings, that the difference in ampere-turns of the main and shunt field windings is substantially constant over a substantial range of temperatures.

7. A direct-current generator operable at a substantially constant voltage over a substantial range of temperatures when operated at a substantially constant speed, said generator comprising a field member, an armature member, a differential shunt field winding on the field member, a main shunt field winding on the field member, said shunt field windings being of a conductor having a substantial temperature coefficient of resistance, a resistor connected in series with the main winding, said resistor having a small temperature coefficient of resistance, and a substantially constant-voltage energizing-means for both of said shunt field windings, the amounts of conducting material in the main and differential windings and the disposition and arrangement of the windings being such that their temperatures rise in service at approximately the same rate, the ampere-turns of the differential winding bearing approximately the same ratio to the ampere-turns of the main winding as the voltage consumed in the main winding bears to the substantially constant voltage impressed on the main winding and the resistor together, and also impressed on the differential winding, at an operating condition of the machine.

8. A direct-current generator operable at a substantially constant voltage over a substantial range of temperatures when operated at a substantially constant speed, said generator comprising a field member, an armature member, a series field winding of such strength as to approximately compensate for the voltage-changing effects of variations in the load, a differential shunt field winding on the field member, a main shunt field winding on the field member, said shunt field windings being of a conductor having a substantial temperature coefficient of resistance, a resistor connected in series with the main winding, said resistor having a small temperature coefficient of resistance, and a substantially constant-voltage energizing-means for both of said shunt field windings, the generator having such relative proportions of resistances of the main and differential shunt field windings and of the resistor, and such relative numbers of turns of the main and differential shunt field windings, that the difference in ampere-turns of the main and shunt field windings is substantially constant over a substantial range of temperatures.

WILLIAM R. HARDING.